US012736940B2

(12) United States Patent
Kikkawa

(10) Patent No.: US 12,736,940 B2
(45) Date of Patent: Sep. 15, 2026

(54) NUMERICAL CONTROL DEVICE

(71) Applicant: FANUC CORPORATION, Yamanashi (JP)

(72) Inventor: Daiki Kikkawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 334 days.

(21) Appl. No.: 18/003,967

(22) PCT Filed: Jul. 6, 2021

(86) PCT No.: PCT/JP2021/025481
§ 371 (c)(1),
(2) Date: Dec. 30, 2022

(87) PCT Pub. No.: WO2022/009888
PCT Pub. Date: Jan. 13, 2022

(65) Prior Publication Data

US 2023/0288900 A1 Sep. 14, 2023

(30) Foreign Application Priority Data

Jul. 9, 2020 (JP) ................................ 2020-118536

(51) Int. Cl.
*G05B 19/18* (2006.01)

(52) U.S. Cl.
CPC .. *G05B 19/182* (2013.01); *G05B 2219/45041* (2013.01)

(58) Field of Classification Search
None
See application file for complete search history.

(56) References Cited

U.S. PATENT DOCUMENTS 4,471,443 A * 9/1984 Kinoshita ............ G05B 19/232 700/193
8,152,422 B2 * 4/2012 Bretschneider ...... G05B 19/404 409/197

(Continued)

FOREIGN PATENT DOCUMENTS

JP 2597597 B2 4/1997
JP H11-275885 A 10/1999

(Continued)

OTHER PUBLICATIONS

Wu Jun et al., "Monitoring of Wire Electrical Discharge Machining Gap State", Journal of Shanghai Jiaotong University, No. 7, Jul. 30, 2001, all pages.

(Continued)

*Primary Examiner* — Jennifer L Norton
(74) *Attorney, Agent, or Firm* — Studebaker Brackett PLLC

(57) ABSTRACT

The present invention provides technology which makes it possible, in a numerical control device for detecting a gap size on the basis of a relationship between the gap size and a nonlinear gap sensor output voltage, to increase the distance that can be detected by the numerical control device while ensuring high detection accuracy of the gap size. This numerical control device 1 comprises: a measurement interval storage unit 12 which stores multiple measurement intervals of output voltage measured by a gap size measurement unit 21, and stores a switching position for switching measurement intervals; a measurement interval control unit 13 which, on the basis of the measurement intervals and the switching position stored in the measurement interval storage unit 12, switches, at the switching position, the measurement interval of the output voltage measured by the gap size measurement unit 21; and a correlation table generation unit 14 which generates a correlation table of the correlation (Continued)

between the output voltage and the gap size on the basis of output voltage that is measured by the gap size measurement unit 21, with the measurement interval of the output voltage being switched at the switching position by the measurement interval control unit 13, and that is stored in a data storage unit 11.

10 Claims, 5 Drawing Sheets

(56) References Cited

U.S. PATENT DOCUMENTS 10,866,574 B2* 12/2020 Sonoda .............. G05B 13/0265
12,449,784 B2* 10/2025 Kikkawa ................ B23Q 15/12
2002/0153880 A1* 10/2002 Slates .................... G01D 5/202 324/207.16
2004/0193306 A1* 9/2004 Kurihara .................. B23H 7/04 700/162
2008/0017615 A1* 1/2008 Yoneda .................... B23H 7/04 219/69.16
2010/0096364 A1* 4/2010 Balemi .................... B23H 7/16 219/69.13
2014/0076856 A1* 3/2014 Furuta ...................... B23H 1/02 219/69.11
2015/0241868 A1* 8/2015 Matsumoto ........ B23K 26/0892 700/114
2015/0273626 A1 10/2015 Tokito
2016/0059351 A1* 3/2016 Miyashita ............ B23K 26/048 219/121.81
2017/0115025 A1 4/2017 Mowris et al.
2017/0282293 A1* 10/2017 Miyata ................. B23K 26/048
2018/0079021 A1* 3/2018 Nishikawa ............... B23H 7/26
2018/0104838 A1* 4/2018 Miyata ................... B26D 5/007
2019/0101890 A1* 4/2019 Iwamura .............. G05B 19/402
2020/0198037 A1* 6/2020 Tsuchiya ................ B23H 1/028
2022/0063008 A1* 3/2022 Yamada ................... B23H 7/02
2023/0264290 A1* 8/2023 Nakamura ......... B23K 26/0876 219/121.85
2023/0384754 A1* 11/2023 Kikkawa ................ B23Q 15/12

FOREIGN PATENT DOCUMENTS

JP H11-275886 A 10/1999
JP 2004-163347 A 6/2004
JP 2006-078370 A 3/2006
JP 2010-054742 A 3/2010
JP 2017-177147 A 10/2017
KR 10-2013-0073148 A 7/2013
WO 2011/089648 A1 7/2011

OTHER PUBLICATIONS

International Search Report issued in PCT/JP2021/025481; mailed Sep. 28, 2021.

* cited by examiner

FIG. 1

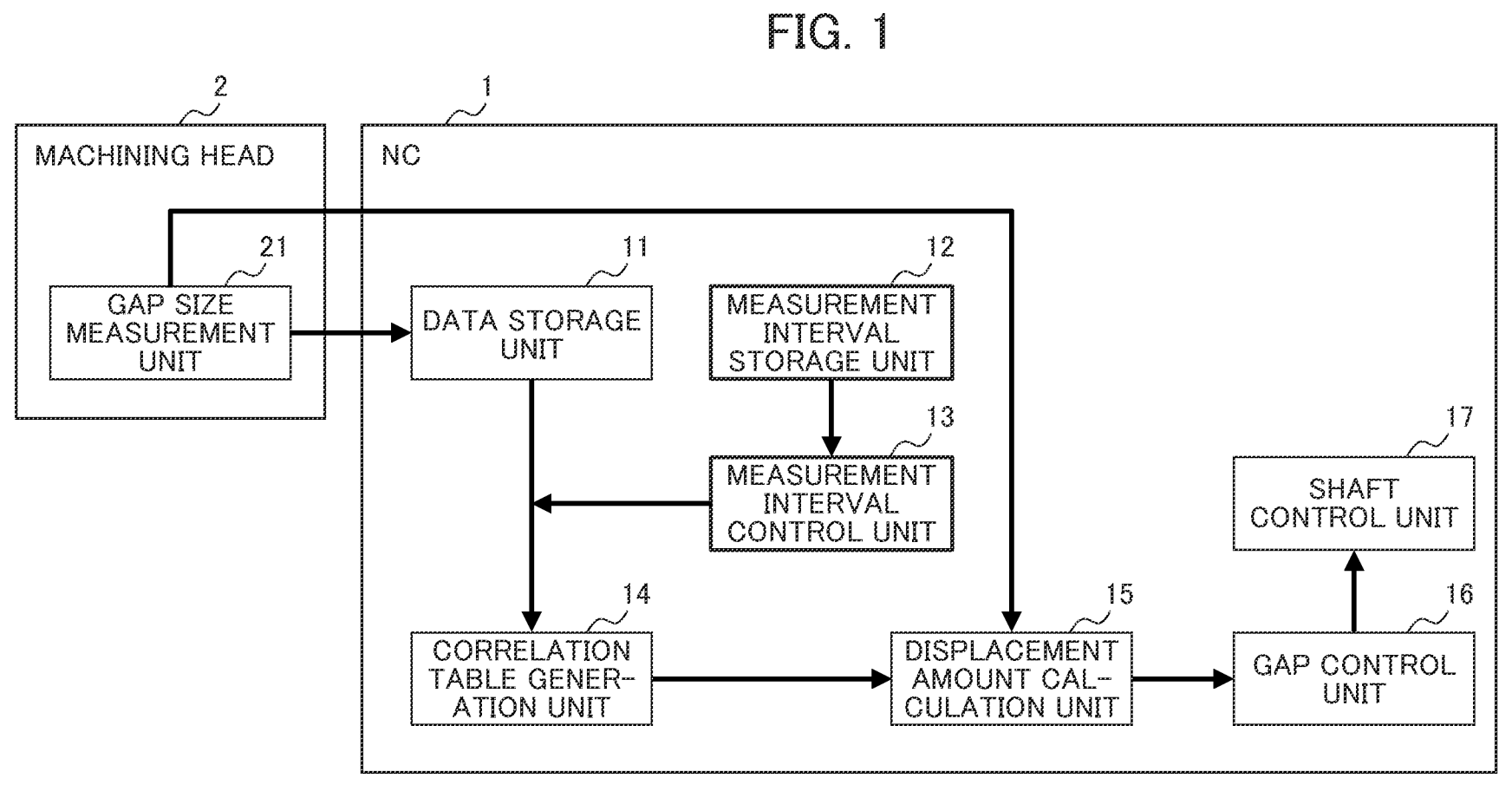

1
NC
11
DATA STORAGE UNIT
12
MEASUREMENT INTERVAL STORAGE UNIT
13
MEASUREMENT INTERVAL CONTROL UNIT
14
CORRELATION TABLE GENERATION UNIT
15
DISPLACEMENT AMOUNT CALCULATION UNIT
16
GAP CONTROL UNIT
17
SHAFT CONTROL UNIT
2
MACHINING HEAD
21
GAP SIZE MEASUREMENT UNIT

WHEN MEASUREMENT INTERVALS ARE NARROW

WHEN MEASUREMENT INTERVALS ARE WIDE

WHEN MEASUREMENT INTERVALS ARE NARROW

WHEN MEASUREMENT INTERVALS ARE WIDE

FIG. 6

WORKPIECE SURFACE

2

21

X2

X2

X1

X1

DISTANCE FROM WORKPIECE SURFACE

REFERENCE POINT

NUMERICAL CONTROL DEVICE

TECHNICAL FIELD

The present disclosure relates to a numerical control device.

BACKGROUND ART

In a conventional laser processing device, a distance (referred to as a gap size) between a machining head and a surface of a workpiece is measured by a gap sensor or the like, and laser machining is performed while a constant gap size is maintained. A voltage corresponding to a gap size output from the gap sensor is input to a numerical control device or the like, and the gap size is detected by the numerical control device.

For example, there has been proposed a technology in which a numerical control device is used to sample and store an output voltage of the gap sensor and detect a gap size on the basis of the stored sampling data (for example, see Patent Document 1). In this technology, the numerical control device stores output voltages of the gap sensor while sampling the output voltages at the constant intervals.

Patent Document 1: Japanese Patent No. 2597597

DISCLOSURE OF THE INVENTION

Problems to be Solved by the Invention

By the way, for example, in the case of a gap sensor of an electrostatic capacitance type or the like, the relationship between its output voltages and the gap size is not proportional. Therefore, the numerical control device detects the gap size by linearly approximating the relationship between the nonlinear gap sensor output voltages and the gap size.

However, in recent years, a distance that can be detected by the gap sensor increases, whereas the storage capacity is limited in a numerical control device on which embedded software is installed, which makes it difficult to increase the number of samples, and thus, the increase in the distance that can be detected by the numerical control device has not been achieved. This is because, for example, widening measurement intervals for sampling makes it possible to increase the distance that can be detected by the numerical control device, however, the widening of the measurement intervals causes a decrease in the detection accuracy, resulting in deterioration in the machining accuracy.

Thus, in the numerical control device for detecting a gap size on the basis of a relationship between the nonlinear gap sensor output voltages and the gap size, a technology is desired capable of increasing the distance that can be detected by the numerical control device while ensuring high detection accuracy of the gap size.

Means for Solving the Problems

One aspect of the present disclosure provides a numerical control device including: a data storage unit that stores an output voltage of a gap size measurement unit, the output voltage corresponding to a gap size which is a distance from a workpiece surface; a correlation table generation unit that generates in advance a correlation table of a correlation between the output voltage stored in the data storage unit and the gap size; a displacement amount calculation unit that calculates a displacement amount which is a distance from a reference position set in a vicinity of the workpiece surface, based on an output voltage newly measured by the gap size measurement unit and the correlation table generated in advance by the correlation table generation unit; a gap control unit that controls the gap size so that the displacement amount calculated by the displacement amount calculation unit becomes equal to a reference displacement amount; and a shaft control unit that controls a drive shaft of a machining head, based on the gap size controlled by the gap control unit. The numerical control device further includes: a measurement interval storage unit that stores multiple measurement intervals for output voltages to be measured by the gap size measurement unit and stores a switching position at which the measurement intervals are switched; and a measurement interval control unit that switches, at the switching position, the measurement intervals for the output voltages to be measured by the gap size measurement unit, based on the measurement intervals and the switching position stored in the measurement interval storage unit. The correlation table generation unit generates the correlation table based on output voltages measured by the gap size measurement unit at the measurement intervals and stored in the data storage unit, the measurement intervals being switched at the switching position by the measurement interval control unit.

Effects of the Invention

According to one aspect of the present disclosure, in a numerical control device that detects a gap size from a relationship between nonlinear gap sensor output voltages and the gap size, a distance that can be detected by the numerical control device can be increased and high detection accuracy of the gap size can be ensured.

BRIEF DESCRIPTION OF THE DRAWINGS

FIG. 1 is a diagram showing a configuration of a numerical control device according to one embodiment of the present disclosure;

FIG. 6 is a diagram for illustrating switching of measurement intervals in a numerical control device according to one embodiment of the present disclosure.

PREFERRED MODE FOR CARRYING OUT THE INVENTION

Figure 2:
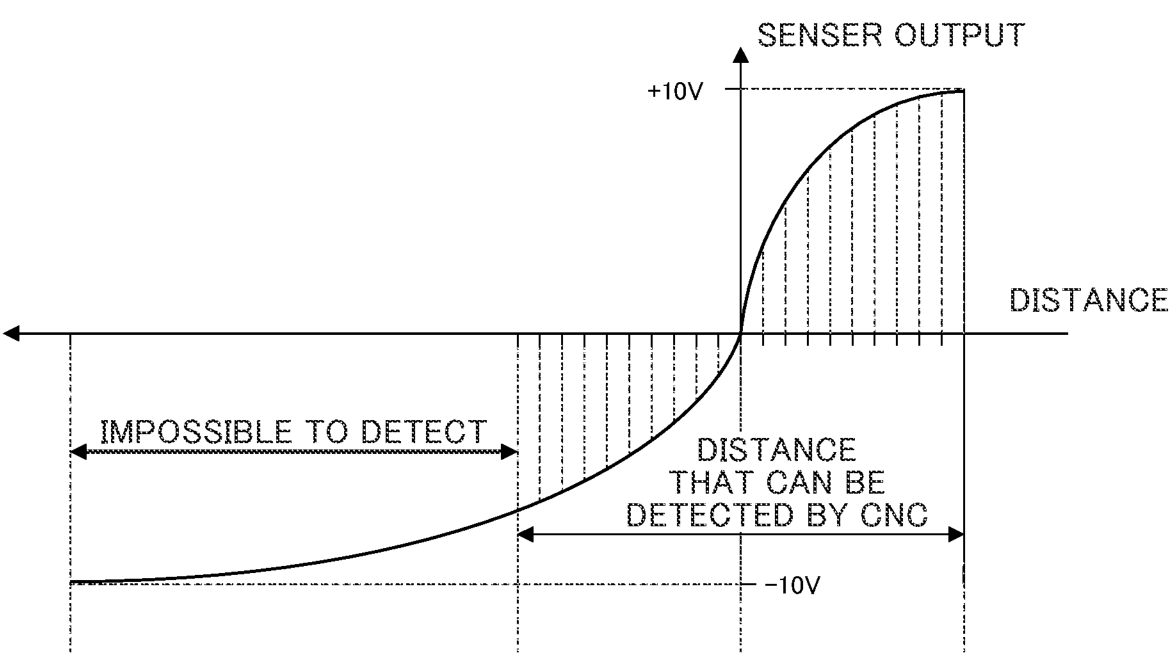
FIG. 2 is a diagram showing a distance that can be detected by a conventional numerical control device when sampling is performed at constant narrow measurement intervals in the numerical control device.

Hereinafter, one embodiment of the present disclosure will be described in detail with reference to the drawings.

A numerical control device 1 according to one embodiment of the present disclosure detects a gap size which is a distance between a machining head 2 of a laser processing device and a surface of a workpiece. Specifically, the numerical control device 1 according to the present embodiment detects a gap size on the basis of voltages corresponding to the gap size output from a gap sensor (not shown) provided in the machining head 2. The laser machining of the present embodiment is performed while a constant gap size is maintained, on the basis of the detected gap size.

A gap size measurement unit 21 included in the machining head 2 acquires output voltages of the gap sensor (not shown) attached to a tip of the machining head 2, for example. The acquired output voltages are transmitted to a data storage unit 11 and a displacement amount calculation unit 15, which will be described later.

The gap sensor may be any sensor that can acquire output voltages or currents, and for example, a gap sensor of an electrostatic capacitance type is used. The gap sensor outputs voltages corresponding to a gap size between the tip of the machining head 2 and the surface of the workpiece while moving together with the machining head 2.

A laser oscillator (not shown) is connected to the machining head 2. The laser oscillator generates laser light, and supplies the laser light to the machining head 2 through a light path. The beam-like laser light emitted from the machining head 2 is used to machine a workpiece which is an object to be machined. The numerical control device 1 according to the present embodiment controls a drive shaft (not shown) to move the machining head 2 with respect to a workpiece in horizontal directions (X-axis and Y-axis directions) and a vertical direction (a Z-axis direction).

FIG. 1 is a diagram showing a configuration of the numerical control device 1 according to one embodiment of the present disclosure. As shown in FIG. 1, the numerical control device 1 includes the data storage unit 11, a measurement interval storage unit 12, a measurement interval control unit 13, a correlation table generation unit 14, the displacement amount calculation unit 15, a gap control unit 16, and a shaft control unit 17. The numerical control device 1 may be constituted by a computer including a CPU, a memory, and the like, for example.

The data storage unit 11 stores output voltages of the gap size measurement unit 21 corresponding to the gap size which is a distance from the surface of the workpiece. The data storage unit 11 of the present embodiment is provided in the numerical control device 1, and the storage capacity is limited in the numerical control device on which embedded software is installed. Therefore, the data storage unit 11 can store the output voltages of the gap size measurement unit 21 for only the limited amount of data.

More specifically, the data storage unit 11 stores multiple pieces of sampling data for generating a correlation table generated by the correlation table generation unit 14, which will be described later. Specifically, the data storage unit 11 associates a gap size when the machining head 2 and the gap sensor gradually rise from the surface of the workpiece with the sampling data of output voltages, and stores this association as the sampling data for generating the correlation table.

The measurement interval storage unit 12 and the measurement interval control unit 13 each have a configuration characteristic of the numerical control device 1 according to the present embodiment, the configuration having not existed conventionally. The measurement interval storage unit 12 and the measurement interval control unit 13 will be described in detail later.

The correlation table generation unit 14 generates in advance the correlation table of the correlation between the output voltages and the gap size stored in the data storage unit 11. Specifically, the correlation table generation unit 14 generates in advance the correlation table of the correlation between the output voltages and the gap size on the basis of the sampling data for generating the correlation table stored in the above-described data storage unit 11. The correlation table generation unit 14 performs a linear approximation between each sampling data, and the obtained approximate straight line is used for calculation of a displacement amount in the displacement amount calculation unit 15, which will be described later.

Note that the correlation table generation unit 14 of the present embodiment is characterized in that the correlation table is generated on the basis of the sampling data measured by switching measurement intervals by the measurement interval storage unit 12 and the measurement interval control unit 13, which will be described in detail later. This will be described in detail later.

The displacement amount calculation unit 15 calculates a displacement amount which is a distance from a reference position set in the vicinity of the surface of the workpiece on the basis of the output values newly measured by the gap size measurement unit 21 and the correlation table generated in advance by the correlation table generation unit 14. Specifically, the displacement amount calculation unit 15 refers to the correlation table generated in advance by the correlation table generation unit 14 and obtains a gap size from the approximate straight line obtained by performing the linear approximation between each sampling data, and the output voltages newly measured, thereby calculating a displacement amount which is a distance from a reference position set in the vicinity of the surface of the workpiece.

The gap control unit 16 controls a gap size so that the displacement amount calculated by the displacement amount calculation unit 15 becomes equal to a reference displacement amount. That is, the gap control unit 16 controls a gap size so that the gap size between the machining head 2 and the surface of the workpiece becomes a constant amount.

The shaft control unit 17 controls the drive shaft of the machining head 2 on the basis of the gap size controlled by the gap control unit 16. In this way, the machining head 2 is moved while the constant gap size is maintained, whereby the laser machining is performed.

Figure 3:
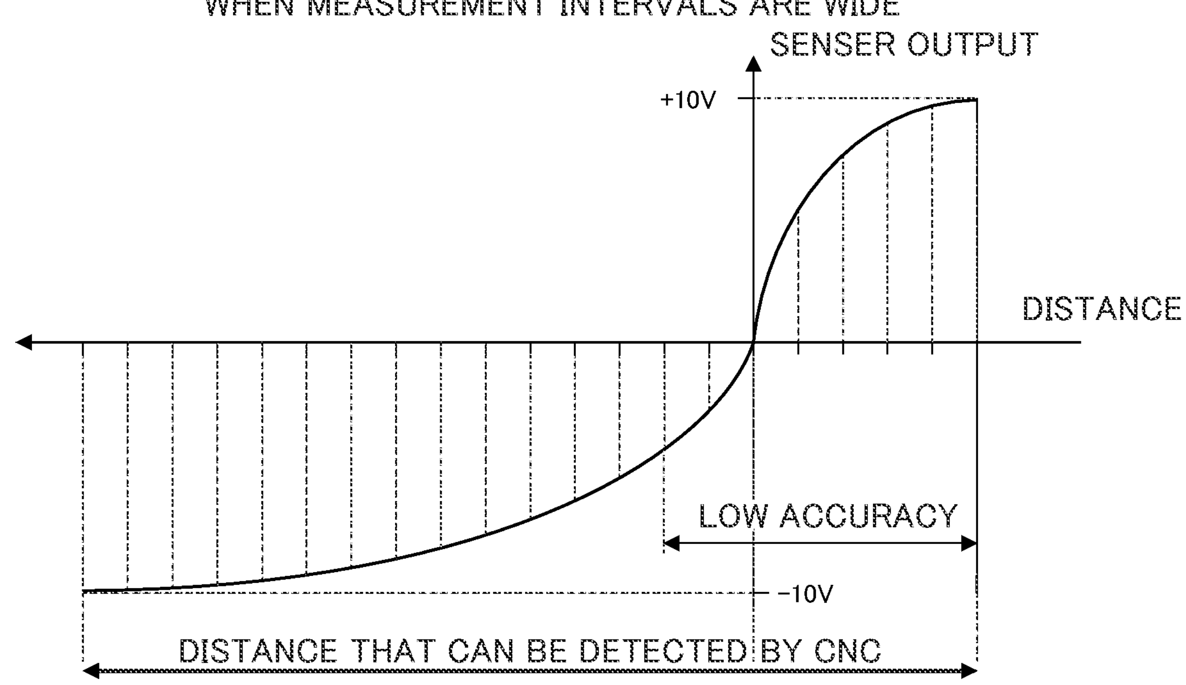
FIG. 3 is a diagram showing a distance that can be detected by the conventional numerical control device when sampling is performed at constant wide measurement intervals in the numerical control device.

Next, the measurement interval storage unit 12 and the measurement interval control unit 13 which are characteristic configurations of the present embodiment will be described in detail. Here, FIG. 2 is a diagram showing a distance that can be detected by a conventional numerical control device (CNC) when sampling is performed at constant narrow measurement intervals in the numerical control device. FIG. 3 is a diagram showing a distance that can be detected by the conventional numerical control device (CNC) when sampling is performed at constant wide measurement intervals in the numerical control device. In FIGS. 2 and 3, the horizontal axis represents a distance from a surface of a workpiece, and the vertical axis represents an output voltage of the gap sensor measured by the gap size measurement unit 21. Note that in FIGS. 2 and 3, measurement intervals are indicated by broken lines, and the further to the right on the horizontal axis, the closer the position is to the surface of the workpiece.

As shown in FIG. 2, it can be understood that, when the gap size is measured at constant narrow measurement intervals, a distance that can be detected by the numerical control device is short. This is because, since the storage capacity of the numerical control device is limited as described above, the number of pieces of sampling data is limited. In contrast, as shown in FIG. 3, it can be understood that, when the gap size is measured at constant wide measurement intervals, the number of pieces of sampling data is the same as that in FIG.

2, but a distance that can be detected by the numerical control device can be increased.

Figure 4:
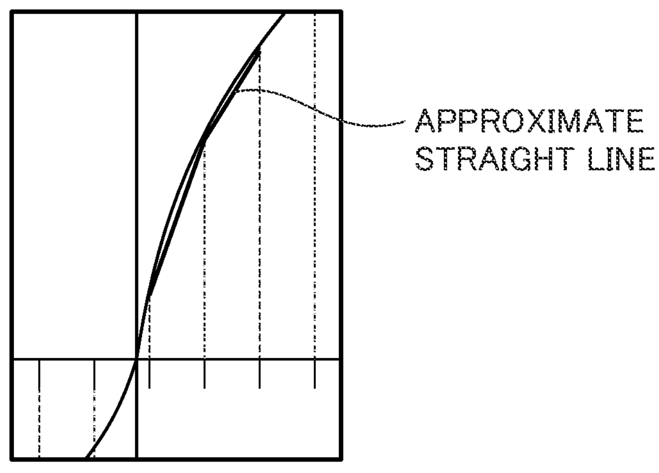
FIG. 4 is an enlarged view of a portion of FIG. 2.
Figure 5:
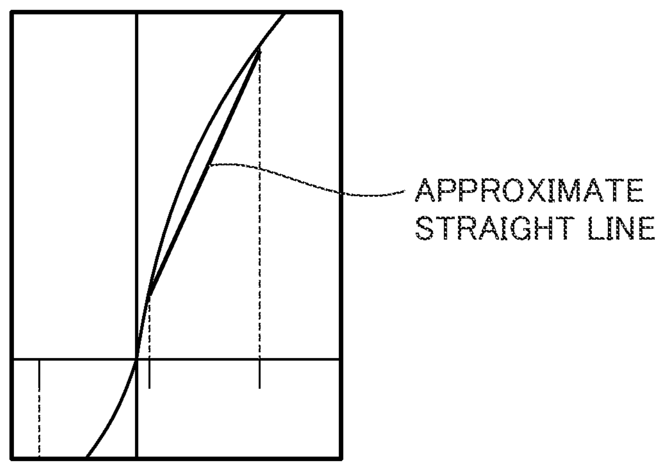
FIG. 5 is an enlarged view of a portion of FIG. 3.

FIG. 4 is an enlarged view of a portion of FIG. 2, and FIG. 5 is an enlarged view of a portion of FIG. 3. As described above, in the gap sensor of an electrostatic capacitance type or the like used in the present embodiment, the relationship between the output voltages and the gap size is non-linear, and therefore the linear approximation is performed between each sampling data to detect a gap size from the obtained approximate straight line. Therefore, it can be understood that an error which is a difference between the original non-linear curve and the approximate straight line is larger when the measurement intervals are wide as shown in FIG. 5 than when the measurement intervals are narrow as shown in FIG. 4. Thus, widening the measurement intervals makes it possible to increase the distance that can be detected by the numerical control device, but the detection accuracy of the gap size is decreased. In particular, the detection accuracy of the gap size is greatly decreased at a position where a change in the output voltage with respect to the distance is large.

Then, in the numerical control device 1 according to the present embodiment, it is possible to increase the distance that can be detected by the numerical control device 1 at a position where the high detection accuracy of the gap size is required, i.e., while maintaining the detection accuracy in the vicinity of the surface of the workpiece, or the like. Specifically, in the numerical control device 1 according to the present embodiment, a configuration is adopted in which the measurement intervals are switched according to a predetermined switching position.

That is, the measurement interval storage unit 12 of the present embodiment stores multiple measurement intervals for output voltages to be measured by the gap size measurement unit 21, and stores a switching position at which the measurement intervals are switched. In this way, the measurement interval storage unit 12 of the present embodiment sets multiple measurement intervals unlike a conventional numerical control device in which constant measurement intervals are set, and stores a switching position at which the measurement intervals are switched. Specifically, as described above, at the position where the high detection accuracy of the gap size is required, the narrow measurement intervals are set. On the other hand, at the position where the high detection accuracy of the gap size is not required, the wide measurement intervals are set. In this case, a switching position at which the measurement intervals are switched is set between both positions.

Then, the measurement interval control unit 13 of the present embodiment switches the measurement intervals for output voltage to be measured by the gap size measurement unit 21 at the switching position on the basis of the measurement intervals and the switching position stored in the above-described measurement interval storage unit 12. This makes it possible to increase the distance that can be detected by the numerical control device 1 at a position where the high detection accuracy of the gap size is required, i.e., while maintaining the detection accuracy in the vicinity of the surface of the workpiece, or the like.

In this case, the above-described correlation table generation unit 14 generates a correlation table on the basis of the output voltages measured by the gap size measurement unit 21 at the measurement intervals and stored in the data storage unit 11, the measurement intervals being switched at the switching position by the measurement interval control unit 13. That is, the correlation table of the present embodiment thus generated is generated on the basis of the output voltages measured at multiple different measurement intervals.

For example, the measurement interval storage unit 12 may determine and store the multiple measurement intervals and the switching position on the basis of at least one selected from a maximum distance from the workpiece surface in an approach direction described in a machining program, a reference displacement amount, and a measurable range of the gap size measurement unit 21. Here, a movement range, i.e., a distance range in the approach direction of the machining head 2 and the gap sensor is determined on the basis of the maximum distance from the workpiece surface in the approach direction described in the machining program and the reference displacement amount. A distance range is determined by the measurable range of the gap sensor of the gap size measurement unit 21. This makes it possible to determine and switch more appropriate measurement intervals by determining the measurement intervals and the switching position on the basis of at least one selected from the maximum distance from the workpiece surface in the approach direction described in the machining program, the reference displacement amount, and the measurable range of the gap size measurement unit 21.

Figure 6:
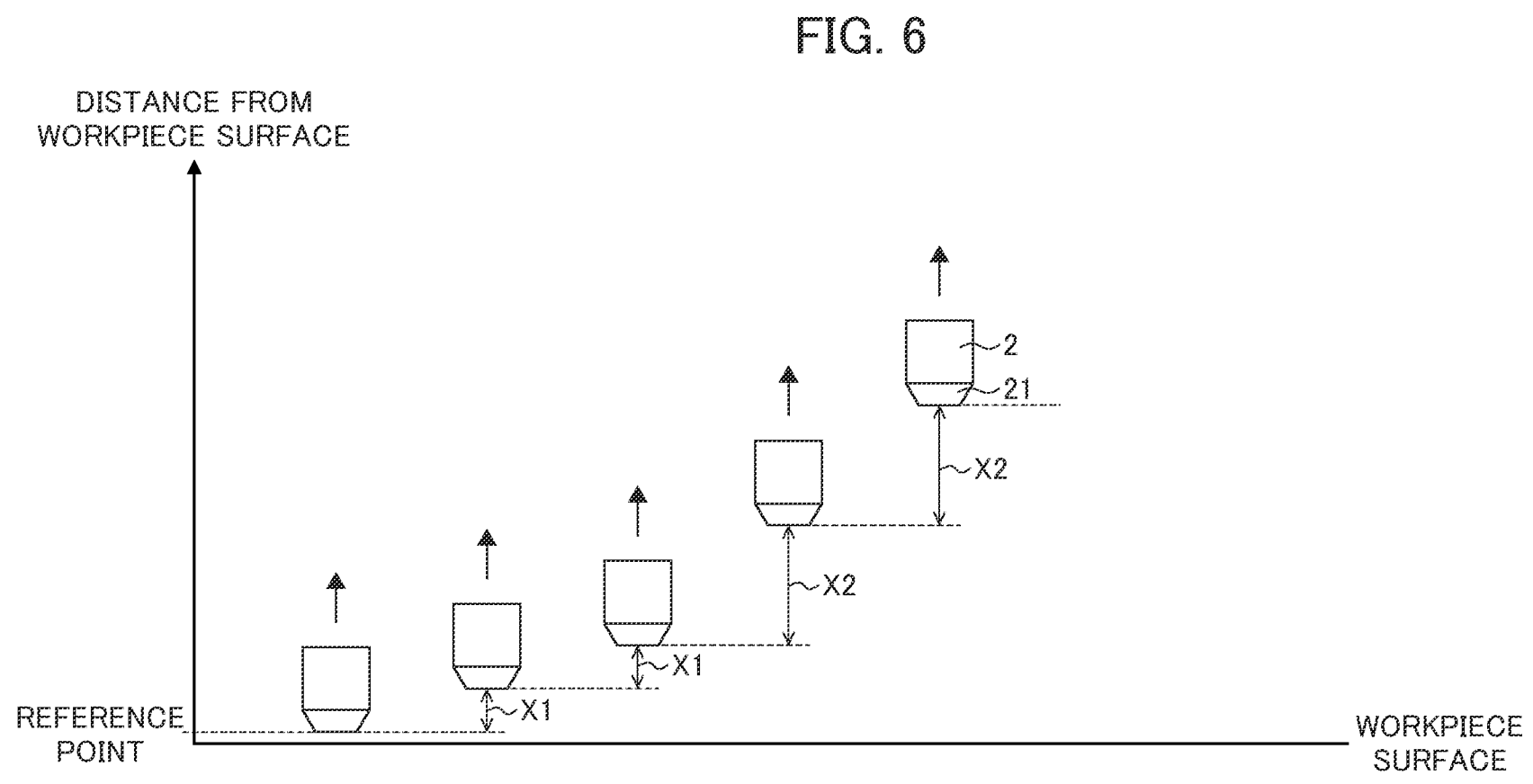

FIG. 6 is a diagram for illustrating switching of measurement intervals in the numerical control device 1 according to the present embodiment. More specifically, FIG. 6 shows an example of measuring the relationship between the output voltages and the gap size while switching the measurement intervals when the correlation table is generated by the correlation table generation unit 14.

In the example shown in FIG. 6, first, an output voltage of the gap sensor is measured when the machining head 2 is disposed at the reference point. Next, an output voltage of the gap sensor is measured when the machining head 2 is raised by a distance X1, and then, an output voltage of the gap sensor is measured when the machining head 2 is further raised by the distance X1. That is, the output voltage of the gap sensor is measured every measurement interval of X1.

Next, an output voltage of the gap sensor is measured when the machining head 2 is raised by a distance X2, and then, an output voltage of the gap sensor is measured when the machining head 2 is further raised by the distance X2. That is, the measurement intervals are switched from X1 to X2, and the output voltage of the gap sensor is measured every measurement interval of X2.

In this way, the measurement interval storage unit 12 may determine and store the multiple measurement intervals and the switching position so that the measurement interval at a position close to the workpiece surface is narrower than the measurement interval at a position far from the workpiece surface. The high detection accuracy can be obtained by measuring the output voltages at the narrow measurement intervals at the machining position in the vicinity of the workpiece surface where the high detection accuracy of the gap size is required, whereas the distance that can be detected by the numerical control device 1 can be increased by measuring the output voltages at the wide measurement intervals at the position remote from the workpiece surface where the high detection accuracy of the gap size is not required.

Figure 7:
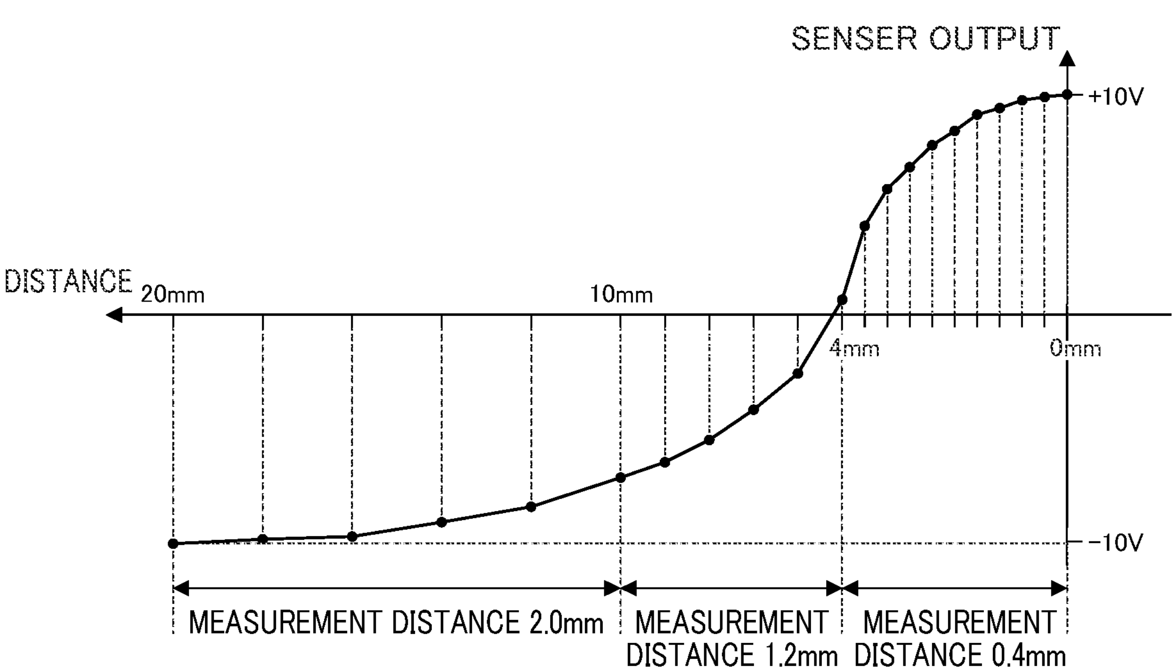
FIG. 7 is a diagram showing a distance that can be detected by the numerical control device according to one embodiment of the present disclosure.

As still another example, switching the measurement interval of the present embodiment will be described. FIG. 7 is a diagram showing a distance that can be detected by the numerical control device 1 according to one embodiment of the present disclosure. In FIG. 7, the horizontal axis represents a distance from a surface of a workpiece, and the vertical axis represents an output voltage of the gap sensor measured by the gap size measurement unit 21. Note that in FIG. 7, measurement intervals are indicated by broken lines, and the further to the right on the horizontal axis, the closer the position is to the surface of the workpiece.

In the example shown in FIG. 7, first, output voltages are measured at 10 points at measurement intervals of 0.4 mm when the machining head 2 and the gap sensor are raised from the reference point, and then the measurement intervals are switched to 1.2 mm at a position of 4 mm (measurement intervals 0.4 mm×10=4 mm) from the reference point. Next, output voltages are measured at 5 points at measurement intervals 1.2 mm, and then the measurement intervals are switched to 2.0 mm at a position of 10 mm (4 mm+measurement interval 1.2 mm×5=10 mm) from the reference point. Then, output voltages are measured at 5 points at measurement intervals 2.0 mm, and then the measurement is completed at a position of 20 mm (10 mm+measurement interval 2.0 mm×5=20 mm) from the reference point. The correlation table of the correlation between the output voltages and the gap size is generated on the basis of the sampling data thus obtained, whereby the distance that can be detected by the numerical control device 1 can be increased to 20 mm, and the high detection accuracy of the gap size can be ensured.

According to the present embodiment, the following effects can be achieved. In the present embodiment, there are provided a measurement interval storage unit 12 that stores multiple measurement intervals for output voltages to be measured by a gap size measurement unit 21, and stores a switching position at which the measurement intervals are switched, and a measurement interval control unit 13 that, on the basis of the measurement intervals and the switching position stored in the measurement interval storage unit 12, switches, at the switching position, the measurement interval of the output voltages measured by the gap size measurement unit 21. Additionally, a correlation table of a correlation between the output voltages and the gap size is generated by a correlation table generation unit 14 on the basis of the output voltages measured by the gap size measurement unit 21 at the measurement intervals and stored in the data storage unit 11, the measurement intervals being switched at the switching position by the measurement interval control unit 13.

This makes it possible to set multiple measurement intervals unlike a conventional numerical control device in which constant measurement intervals of the gap size are set, and therefore, when a correlation table is generated, the gap size can be measured at narrow measurement intervals at a position where the high detection accuracy of the gap size is required, whereas the gap size can be measured at wide measurement intervals at a position where the high detection accuracy of the gap size is not required. Therefore, the correlation table of the correlation between the output voltages and the gap size can be generated on the basis of the output voltages measured at the measurement intervals and stored, the measurement intervals being switched at a predetermined switching position. Thus, in the numerical control device 1 for detecting a gap size on the basis of a relationship between the nonlinear gap sensor output voltages and the gap size, the distance that can be detected by the numerical control device 1 can be increased and the high detection accuracy of the gap size can be ensured.

A movement speed of the machining head 2 is controlled by the shaft control unit 17 according to the distance from the reference point, while according to the present embodiment, the distance that can be detected by the numerical control device 1 can be increased, whereby a controllable range can be appropriately increased by the machining head 2.

In the present embodiment, a configuration is adopted in which multiple measurement intervals and a switching position are determined and stored on the basis of at least one selected from a maximum distance from the workpiece surface in an approach direction described in a machining program, a reference position, and a measurable output range of the gap size measurement unit 21. This makes it possible to determine and store more appropriate measurement intervals and switching position, and therefore the distance that can be detected by the numerical control device 1 can be more appropriately increased and the high detection accuracy of the gap size can be ensured.

In the present embodiment, a configuration is adopted in which multiple measurement intervals and a switching position are determined and stored so that the measurement interval at a position close to the workpiece surface is narrower than the measurement interval at a position far from the workpiece surface. This makes it possible to narrow the measurement intervals of the gap size at a position closer to the workpiece surface to be subjected to the laser machining, and therefore the distance that can be detected by the numerical control device 1 can be more appropriately increased and the high detection accuracy of the gap size can be ensured.

It is noted that the present disclosure is not limited to the above-described embodiments, and includes modifications and improvements within the scope which can achieve the object of the present disclosure.

In the above-described embodiment, an example has been illustrated in which multiple measurement intervals and a switching position are determined and stored so that the measurement interval at a position close to the workpiece surface is narrower than the measurement interval at a position far from the workpiece surface, but the present disclosure is not limited to this example. Since the laser is applied from a position remote from the workpiece surface when hole formation processing is performed with a laser before the laser machining, for example, it is preferable that the measurement intervals at the position remote from the workpiece surface is set narrower than those at the position in the vicinity of the workpiece surface.

EXPLANATION OF REFERENCE NUMERALS

- 1: Numerical control device
- 2: Machining head
- 11: Data storage unit
- 12: Measurement interval storage unit
- 13: Measurement interval control unit
- 14: Correlation table generation unit
- 15: Displacement amount calculation unit
- 16: Gap control unit
- 17: Shaft control unit
- 21: Gap size measurement unit

The invention claimed is:

1. A numerical control device comprising:

a memory configured to store a program that causes the numerical control device to perform a method of controlling a machining head of a laser processing device; and a processor configured to execute the program to perform:

storing an output voltage corresponding to a gap size which is a distance from a workpiece surface;

generating in advance a correlation table of a correlation between the output voltage and the gap size, the correlation table including first voltage values in association with first gap sizes and second voltage values in association with second gap sizes, the first gap sizes calculated based on a first measurement interval between gap sizes for linearly approximating the first gap sizes based on the first voltage values, and the second gap sizes calculated based on a second measurement interval between the gap sizes for linearly approximating the second gap sizes based on the second voltage values, wherein the first measurement interval is different from the second measurement interval;

calculating a displacement amount equal to a first gap size among the first gap sizes which is a distance from a reference position set in a vicinity of the workpiece surface, based on an output voltage newly measured corresponding to a first voltage value among the first voltage values associated with the first gap sizes;

controlling the gap size so that the displacement amount calculated based on the output voltage associated with the first gap sizes becomes equal to a reference displacement amount;

switching, in response to the displacement amount calculated switching from among the first gap sizes to the second gap sizes, from controlling the gap size based on the output voltage associated with the first gap sizes to controlling the gap size so that the displacement amount calculated based on the output voltage associated with the second gap sizes becomes equal to the reference displacement amount; and controlling a drive shaft of the machining head according to the distance from a reference point, based on the gap size controlled, to machine the workpiece surface.

2. The numerical control device according to claim 1, wherein the processor is configured to execute the program to perform determining and storing the first measurement interval and the second measurement interval, based on at least one selected from a maximum distance from the workpiece surface in an approach direction described in a machining program, the reference displacement amount, and a measurable range.

3. The numerical control device according to claim 1, wherein the processor is configured to execute the program to perform determining and storing the first measurement interval and the second measurement interval so that the second measurement interval at a position closer to the workpiece surface is narrower than the first measurement interval at a position farther from the workpiece surface.

4. The numerical control device according to claim 2, wherein the processor is configured to execute the program to perform determining and storing the first measurement interval and the second measurement interval so that the second measurement interval at a position closer to the workpiece surface is narrower than the first measurement interval at a position farther from the workpiece surface.

5. A method of a numerical control device controlling a machining head of a laser processing device, the method comprising:

storing an output voltage corresponding to a gap size which is a distance from a workpiece surface;

generating in advance a correlation table of a correlation between the output voltage and the gap size, the correlation table including first voltage values in association with first gap sizes and second voltage values in association with second gap sizes, the first gap sizes calculated based on a first measurement interval between gap sizes for linearly approximating the first gap sizes based on the first voltage values, and the second gap sizes calculated based on a second measurement interval between the gap sizes for linearly approximating the second gap sizes based on the second voltage values, wherein the first measurement interval is different from the second measurement interval;

calculating a displacement amount equal to a first gap size among the first gap sizes which is a distance from a reference position set in a vicinity of the workpiece surface, based on an output voltage newly measured corresponding to a first voltage value among the first voltage values associated with the first gap size;

controlling the gap size so that the displacement amount calculated based on the output voltage associated with the first gap sizes becomes equal to a reference displacement amount;

switching, in response to the displacement amount calculated switching from among the first gap sizes to the second gap sizes, from controlling the gap size based on the output voltage associated with the first gap sizes to controlling the gap size so that the displacement amount calculated based on the output voltage associated with the second gap sizes becomes equal to the reference displacement amount; and controlling a drive shaft of a machining head according to the distance from a reference point, based on the gap size controlled, to machine the workpiece surface.

6. The method according to claim 5, further comprising determining and storing the first measurement interval and the second measurement interval, based on at least one selected from a maximum distance from the workpiece surface in an approach direction described in a machining program, the reference displacement amount, and a measurable range.

7. The method according to claim 6, further comprising determining and storing the first measurement interval and the second measurement interval so that the second measurement interval at a position closer to the workpiece surface is narrower than the first measurement interval at a position farther from the workpiece surface.

8. The method according to claim 5, further comprising determining and storing the first measurement interval and the second measurement interval so that the second measurement interval at a position closer to the workpiece surface is narrower than the first measurement interval at a position father from the workpiece surface.

9. A method of a numerical control device controlling a machining head of a laser processing device, the method comprising:

acquiring a voltage output by a gap sensor attached to a tip of a machining head configured to perform laser machining on a workpiece;

determining a gap size of a gap between the tip of the machining head and reference position relative to a surface of the workpiece based on the voltage and a first linear approximation of a non-linear correlation between first voltage values and first gap sizes between the tip of the machining head and the reference position sampled at a first sampling interval;

controlling a drive shaft of the machining head to control the gap size of the gap to be equal to a reference amount based on the voltage and a second linear approximation of the non-linear correlation between second voltage values and second gap sizes between the tip of the machining head and the reference position sampled at a second sampling interval that is different from the first sampling interval; and controlling the machining head of the laser processing device to perform laser machining of the workpiece while maintaining the gap size of the gap to be constant based on the voltage output by the gap sensor and the second linear approximation.

10. The method of claim 9, wherein the controlling comprises:

determining that the gap size determined based on the first linear approximation switches from among the first gap sizes to the second gap sizes;

switching from determining the gap size based on the first linear approximation to determining the gap size based on the second linear approximation, in response to determining that the gap size switches from among the first gap sizes to the second gap sizes;

determining the gap size based on the voltage output by the gap sensor and the second linear approximation; and controlling the drive shaft of the machining head to control the gap size of the gap to be equal to the reference amount based on the voltage output by the gap sensor and the gap size determined based on the voltage output by the gap sensor and the second linear approximation.

* * * * *